US012645755B2

(12) United States Patent (10) Patent No.: US 12,645,755 B2
Da Costa et al. (45) Date of Patent: Jun. 2, 2026

(54) DATA PROCESSING IN A MACHINE LEARNING COMPUTER

(71) Applicant: Graphcore Limited, Bristol (GB)

(72) Inventors: Godfrey Da Costa, Bristol (GB);
Badreddine Noune, Bristol (GB);
Daniel Justus, Bristol (GB); Carlo Luschi, Oxford (GB)

(73) Assignee: GRAPHCORE LIMITED, Bristol (GB)

( * ) Notice: Subject to any disclaimer, the term of this patent is extended or adjusted under 35 U.S.C. 154(b) by 763 days.

(21) Appl. No.: 18/066,627

(22) Filed: Dec. 15, 2022

(65) Prior Publication Data

US 2023/0185880 A1 Jun. 15, 2023

Related U.S. Application Data

(60) Provisional application No. 63/265,436, filed on Dec. 15, 2021.

(51) Int. Cl.
| | |
|---|---|
| *G06F 18/211* | (2023.01) |
| *G06F 18/21* | (2023.01) |
| *G06F 18/22* | (2023.01) |
| *G06N 3/04* | (2023.01) |
| *G06N 3/044* | (2023.01) |
| *G06N 3/0464* | (2023.01) |
| *G06N 3/048* | (2023.01) |
| *G06N 3/084* | (2023.01) |
| *G06V 10/82* | (2022.01) |

(52) U.S. Cl.
CPC .......... *G06F 18/211* (2023.01); *G06F 18/217* (2023.01); *G06F 18/22* (2023.01); *G06N 3/04* (2013.01); *G06N 3/048* (2023.01); *G06N*

*3/084* (2013.01); *G06V 10/82* (2022.01); *G06N 3/044* (2023.01); *G06N 3/0464* (2023.01)

(58) Field of Classification Search
CPC ............ G06N 3/02; G06N 3/04; G06N 3/044; G06N 3/0464; G06N 3/048; G06N 3/08; G06N 3/084; G06N 20/00; G06N 20/10; G06N 20/20; G06F 18/211; G06F 18/217; G06F 18/22; G06V 10/82
See application file for complete search history.

(56) References Cited

U.S. PATENT DOCUMENTS

2021/0125042 A1* 4/2021 Han ..................... G06N 3/0495
2022/0044109 A1* 2/2022 Donnelly ............. G06N 3/0495

* cited by examiner

*Primary Examiner* — Shane D Woolwine
(74) *Attorney, Agent, or Firm* — HAYNES AND BOONE, LLP

(57) ABSTRACT

A computer-implemented method comprising: processing data in a neural network to compute a network tensor comprising a plurality of tensor elements represented in an initial numerical format; computing a histogram of tensor elements; selecting a target numerical format, the target numerical format having a lower precision than the initial numerical format; evaluating a metric based on the histogram of tensor elements and the target numerical format, the metric indicating a degree of accuracy of a representation of the network tensor in the target numerical format; and based on the evaluated metric, converting the plurality of tensor elements from the initial numerical format to the target numerical format.

17 Claims, 7 Drawing Sheets

FIG.
1C
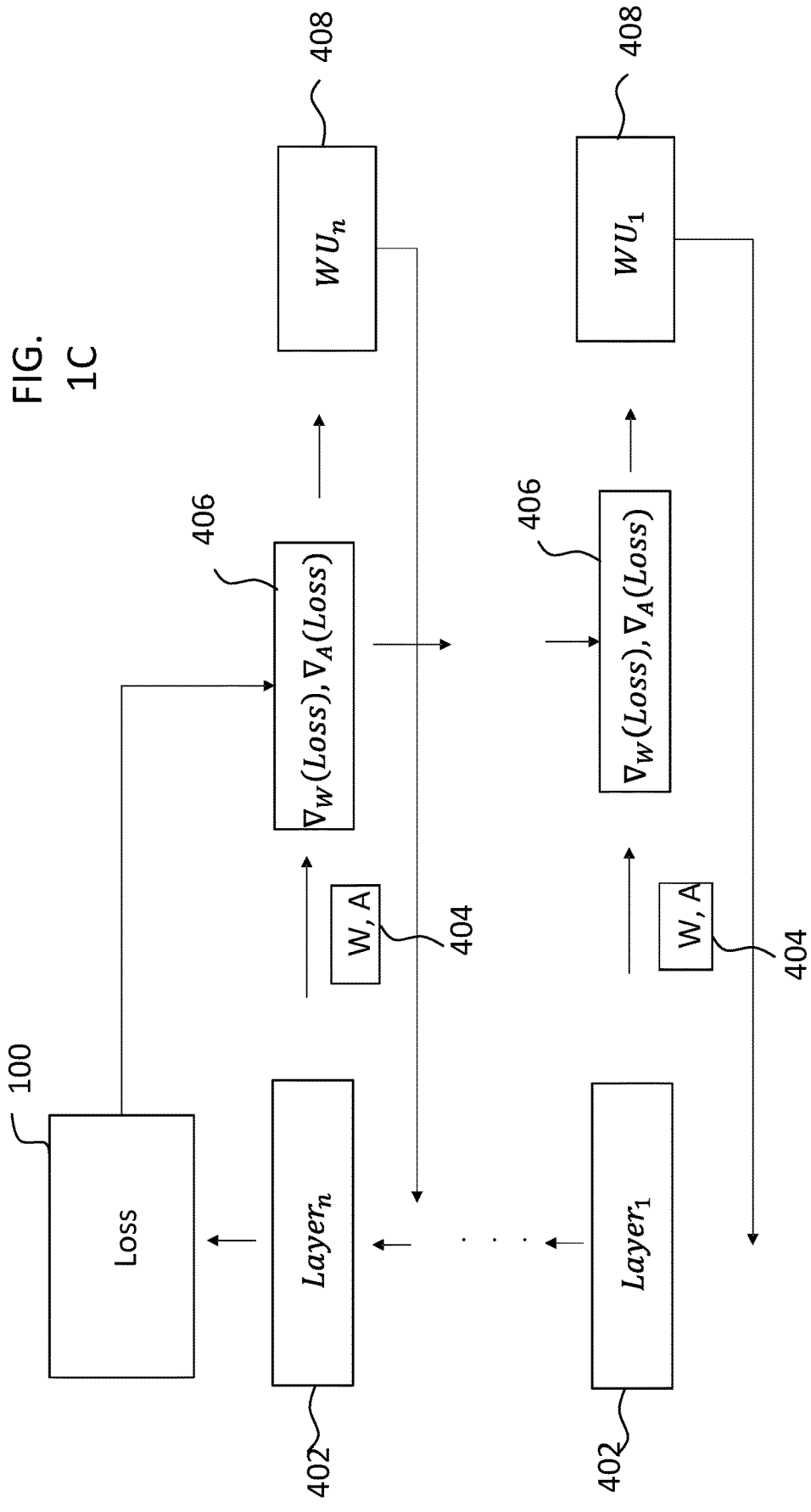

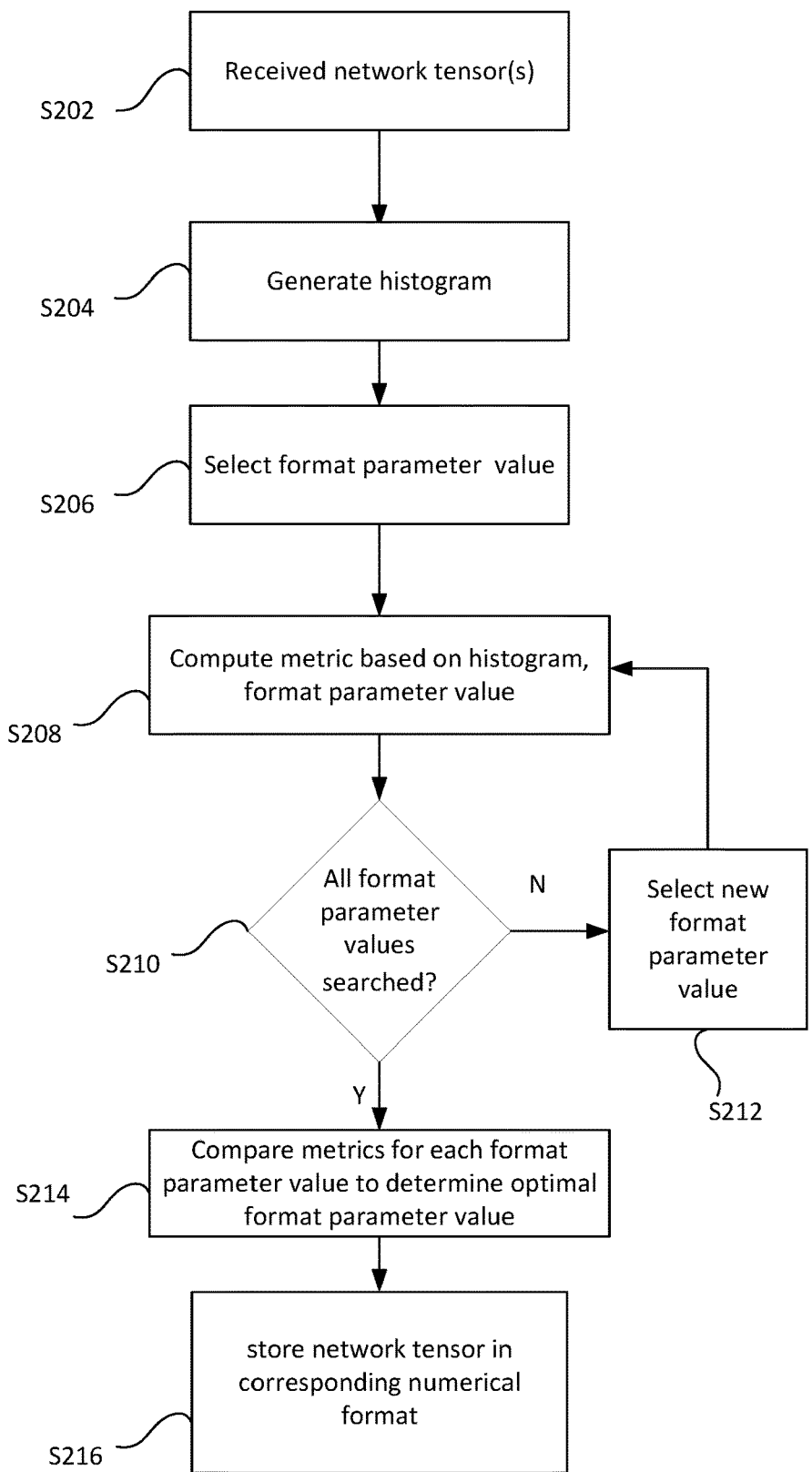

S202 — Received network tensor(s)

S204 — Generate histogram

S206 — Select format parameter value

S208 — Compute metric based on histogram, format parameter value

S210 — All format parameter values searched?

S212 — Select new format parameter value    N

Y

S214 — Compare metrics for each format parameter value to determine optimal format parameter value S216 — store network tensor in corresponding numerical format

Figure 2

DATA PROCESSING IN A MACHINE LEARNING COMPUTER

CROSS-REFERENCE TO RELATED APPLICATIONS

The present application claims priority to U.S. Provisional Application No. 63/265,436, filed Dec. 15, 2021, the disclosure of which is hereby incorporated herein by reference.

TECHNICAL FIELD

The present disclosure relates to processing and storage of data in a machine learning computer.

BACKGROUND

In computing, bit sequences of predefined sizes are used to represent numbers. The particular representation of the bit sequence determines how a bit sequence is interpreted.

One form of representation is the floating-point representation, which is often used to approximately represent real numbers. The floating-point representation comprises three separate components, i.e. a sign bit $s \in \{0,1\}$, an m-bit mantissa with bits $d_i$, $i=1, \ldots, m$, and an e-bit exponent p, $0 \le p < 2^e$. In the single-precision (i.e. 32-bit) floating-point representation according to the IEEE 754 standard, the sign component consists of a single bit, the exponent consists of $e=8$ bits, and the mantissa consists of $m=23$ bits. In the half-precision (i.e. 16-bit) floating-point representation, the exponent consists of $e=5$ bits, and the mantissa consists of $m=10$ bits. In most cases, a real number is represented from these three components of the floating-point format by the following formula:

$$(-1)^s \ 2^{p-b} \left(1 + \frac{d_1}{2} + \frac{d_2}{2^2} + \cdots + \frac{d_m}{2^m}\right)$$

The displayed exponent bias b allows to offset the representation of the exponent. This exponent bias is commonly given by $b=2^{e-1}-1$ and is dependent on the number of bits e used to represent the exponent for the given floating-point format. In the single-precision representation, according to the IEEE 754 standard, the exponent bias is equal to $2^7-1=127$. In the half-precision format, the exponent bias is equal to $2^4-1=15$.

As shown in the above formula, the representation of the mantissa typically relies on an implicit bit, which is derived from the exponent. In the case where the exponent bit sequence consists of anything other than all zeros or all ones, the implicit bit is equal to 1 and the number is known as a "norm". In this case, the floating-point number is given by:

$$(-1)^s \ 2^{p-b} \left(1 + \frac{d_1}{2} + \frac{d_2}{2^2} + \cdots + \frac{d_m}{2^m}\right)$$

In the case that the exponent bit sequence consists of all zeros, the implicit bit is equal to zero and the number is known as "subnormal". In this case, the floating-point number is given by:

$$(-1)^s \ 2^{1-b} \left(0 + \frac{d_1}{2} + \frac{d_2}{2^2} + \cdots + \frac{d_m}{2^m}\right)$$

Subnormal numbers are useful, since they allow smaller numbers to be represented than would otherwise be representable by the limited number of exponent bits.

The other circumstance—in which the exponent bit sequence consists of all ones—may be used to represent special cases, e.g. ±infinity or NaN (not a number). NaN is a numeric data type value representing an undefined or unrepresentable value. The presence of a NaN in the results of a calculation is often taken to signal an exception.

Another form of representation is the integer representation. The integer may be signed, in which case a single bit of the bit sequence is used to represent the sign of the number, with the remaining bits of the bit sequence used to represent the magnitude of the number. Another common representation for signed integers is two's complement representation.

Alternatively, the integer may be unsigned, in which all of the bits of the bit sequence are used to represent the magnitude of the number.

Floating-point representation is used to represent numbers in most current implementations of neural network processing.

A standard floating-point representation FP32, known as single-precision floating-point format, uses 32 bits in memory and can represent a very large range of numbers (from ~$10^{-38}$ to ~$10^{38}$). Lower-precision formats using sixteen bits (FP16) or even eight bits (FP8) represent a significant reduction in memory usage and computational cost, particularly when used for representing a deep learning model with up to millions or billions of parameters. However, using fewer bits to represent a number means that the range of representable values is significantly reduced. Lower-precision formats can lead to two possible problems when applying arithmetic operations to numbers stored in this format: numerical underflow and overflow. Underflow occurs when the absolute value of a number is too small to be represented in the chosen number format. Where an arithmetic operation gives a result which is too small to be represented in the chosen floating-point format, leading to underflow, and the number will instead be represented as zero. Numerical overflow occurs when the absolute value of a number is too large to represent in the chosen format. In this case, the number may be represented as positive or negative infinity, or be saturated ('clipped') to the maximum positive or negative number that can be represented by the chosen format. As mentioned above, for FP32 numerical overflow only occurs for numbers with absolute values greater than ~$10^{38}$. However, for FP8, numerical overflow occurs at much lower absolute values, and overflow could occur when training a neural network, if weights, activations or gradients grow sufficiently large.

Furthermore, within their range of representative values, lower-precision formats are associated with greater quantization error, i.e. error between the value as represented in the low-precision format and the real number it represents, since lower precision formats have fewer significant bits.

As machine learning models become larger and more complex, it becomes more computationally expensive to train and implement these models. Computer systems having multiple processors that run in parallel and communicate with one another are often used to train and run large machine intelligence models, in order to be able to split the models between multiple processors each having their own memory and compute resources, allowing large amounts of data to be processed simultaneously.

One way of speeding up training and deployment of a machine learning model is by using mixed precision methods. These methods involve using multiple numerical formats to store different data of the model. For example, the activations and weights of a neural network model or a subset of the weights, are converted to a lower-precision format such as FP8, while the result of multiply-accumulate operations may be stored in single-precision FP32 format, or half-precision FP16 format. The lower precision data requires less memory to store, as well as reducing the computational cost of arithmetic operations such as multiplication, which is very common in training of neural networks.

SUMMARY

While mixed precision training and implementation of neural networks does lead to more efficient processing, an issue can arise when different arrays of data within the network have different scales. At higher precisions, this does not generally present a problem of representation due to the wide range of representable values, as mentioned above. However, at lower precisions, in particular for FP8 or lower, it can occur that many or most of the values of a network array (also referred to herein as a tensor, which is an array of arbitrary dimension) falls outside the range of representable values of the low-precision format. Floating-point numbers are typically stored in 64- and 32-bit formats according to the IEEE standard, which specifies an assignment of bits to each of the exponent and the mantissa, as well as a fixed exponent bias. Due to the ranges associated with these representations, the standard bit assignments and biases are generally able to represent most values encountered in everyday applications. However, at lower precisions, where the exponent may have 5 or fewer bits, it is more difficult to represent values of different network tensors spanning different ranges without at least some of those values falling outside the representable range of the chosen format.

Described herein is a method of determining a format for representing a network tensor that is dependent on the statistics of that network tensor itself. This allows the network tensor to be represented in a low-precision format that is matched to the range of the tensor data, improving the precision with which the values are represented.

A first aspect herein provides a computer-implemented method comprising: processing data in a neural network to compute a network tensor comprising a plurality of tensor elements represented in an initial numerical format; computing a histogram of the tensor elements; selecting a target numerical format, the target numerical format having a lower precision than the initial numerical format; evaluating a metric based on the histogram of tensor elements and the target numerical format, the metric indicating a degree of accuracy of a representation of the network tensor in the target numerical format; and based on the evaluated metric, converting the plurality of tensor elements from the initial numerical format to the target numerical format.

Tailoring the floating-point representation used to represent the data according to the statistics of that data, rather than using a standard floating-point representation allows more accurate representation of the data, while benefitting from the computational efficiency improvements associated with low-precision formats. When used in mixed-precision training and deployment, the methods described herein may be applied to determine an optimal format for each of multiple network tensors that could not accurately be represented by a common low-precision format.

BRIEF DESCRIPTION OF FIGURES

For a better understanding of the present disclosure, and to show how embodiments of the same may be carried into effect, reference is made by way of example only to the following figures, in which:

FIG. 1C is a block diagram showing gradient-based training of a neural network;

FIG. 2 is a flow diagram showing an example method of selecting a numerical format for representing tensor values;

DETAILED DESCRIPTION

Described herein are methods for efficient training and implementation of machine intelligence models using low precision representations for storing and processing model data while preserving accuracy. Some background on machine intelligence models and training of neural networks is provided below, before the methods of determining suitable formats for network tensors are described with reference to FIGS. 2-4.

Figure 1A:
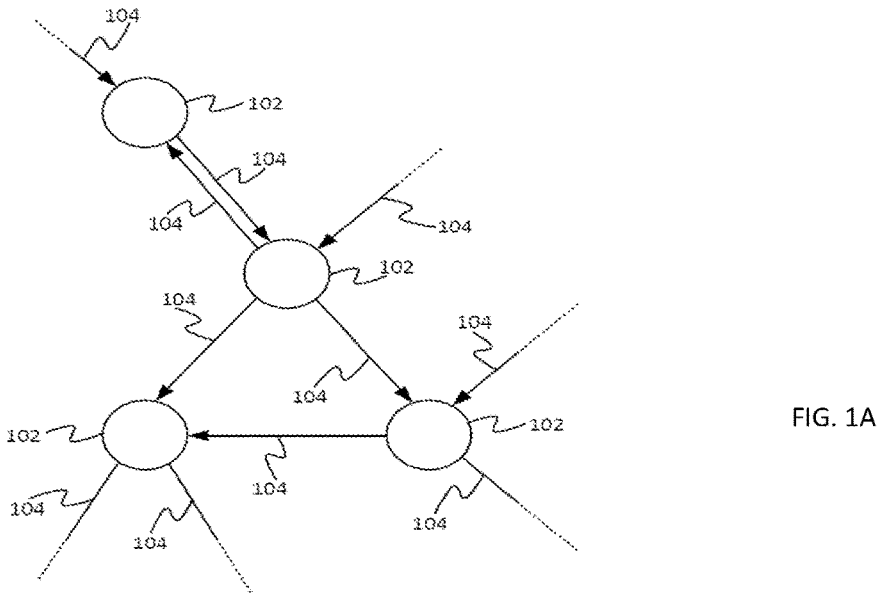
FIGS. 1A-1B show simplified examples of the computation associated with machine intelligence models.

FIG. 1A illustrates an example machine intelligence model in the form of a neural network. As will be familiar to a person skilled in the art of machine intelligence, machine intelligence begins with a learning stage where the machine intelligence algorithm learns a knowledge model. The model may be represented as a graph 60 of interconnected nodes 102 and links 104. Nodes and links may be referred to as vertices and edges. Each node 102 in the graph has one or more input edges and one or more output edges, wherein some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Each edge 104 communicates a value commonly in the form of a tensor, these forming the inputs and outputs provided to and from the nodes 102 on their input and output edges respectively.

Each node 102 represents a function of its one or more inputs as received on its input edge or edges, with the result of this function being the output(s) provided on the output edge or edges. These results are sometimes referred to as activations. Each function is parameterised by one or more respective parameters (sometimes referred to as weights, though they need not necessarily be multiplicative weights). In general, the functions represented by the different nodes 102 may be different forms of function and/or may be parameterised by different parameters. In deep neural network architectures, nodes are arranged into layers, with nodes of each layer receiving tensors on the output edges of the previous layer, and communicating their own outputs to nodes of the next layer in the network.

Figure 1B:
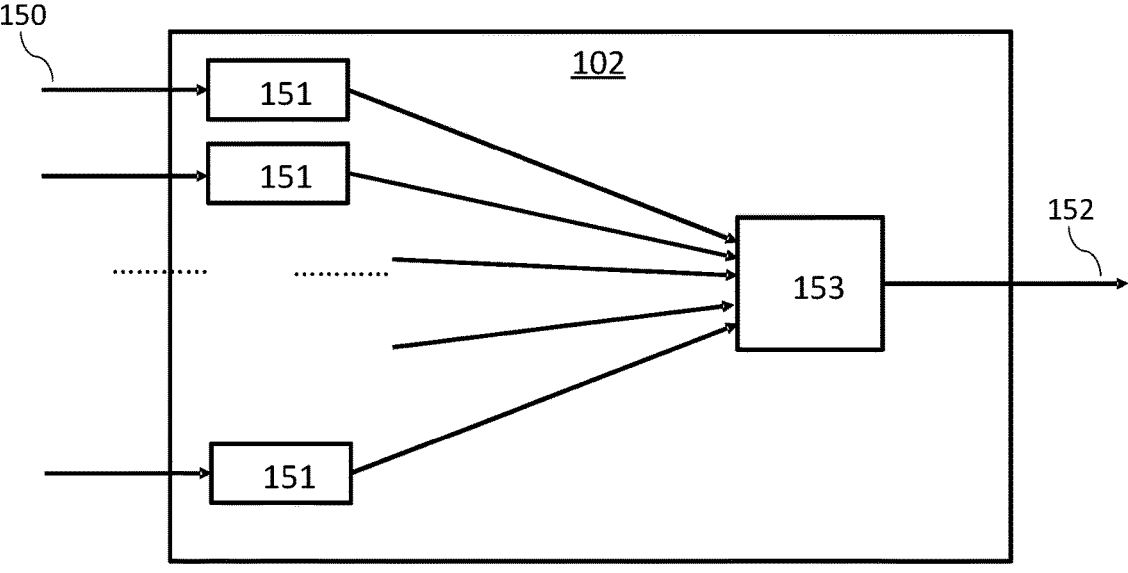

FIG. 1B furthermore provides a simplified representation of an example node 102. Each node 102 represents a function of its inputs. Some nodes receive the inputs to the graph (in a multi-layer network, these nodes form the 'input layer') and some receive inputs from one or more other nodes (in a multi-layer network, these nodes are within 'hidden layers' of the network). The output of nodes in input and hidden layers form the inputs of nodes in the respective next layer. At a final 'output layer', the output of the nodes provides the output of the graph.

Further, the function at each node is parameterised by one or more respective parameters, e.g. weights 151, which are applied to the input activations. The inputs 150 to the node 102 are each multiplied by a weight, before summing them, and input to the activation function 153, which generates the output activation.

The activation function generator 153 is configured to receive weighted input values and generate an output value based on the activation function. The activation function is typically a non-linear function attached to each node in the network that determines whether it should be activated ("fired") or not, based on whether each node's input is relevant for the model's prediction. Certain activation functions, such as sigmoid or tanh, also help normalise the output of each node to a range, for example between 1 and 0 or between −1 and 1. Other activation functions, such as a rectified linear unit (ReLU), do not normalise the output. The output 152 is then fed as an input to a subsequent layer of the network, where it is multiplied by the weights of that layer.

In a standard deep neural network architecture, each node of a given layer is connected via a link 104 to every node of a subsequent layer. Networks with this all-to-all connectivity may be referred to as 'fully connected'. In a convolutional neural network however, each node of a layer applies a 'filter' of weights (which may also be referred to as a kernel) in a sliding window to an input tensor to determine a weighted input to a node 102, where the filter only applies to a subset of input values to the given layer at a time. The subset of inputs that the filter 'sees' at a time may be referred to as the receptive field. Other common neural network architectures include recurrent neural networks and transformer architectures. Various implementations of these architectures exist in the art and will not be described further herein.

As described above, the output of each node or 'neuron' of a neural network depends on one or more parameters or weights applied to the set of inputs to that node. To train a neural network, the parameters at each layer are updated according to a learning scheme, to optimise a training goal. For example, where a goal is to train a network to identify object classes present in an input image, the output layer may be configured to output an indicator for a predicted class from among a set of possible classes, and the training goal may be to maximise an accuracy of the neural network's prediction for a set of input images where the class of the objects within the images are known. In this context, deep neural networks are obtained by stacking multiple layers. The strength of these multi-layer architectures is that successive layers have the possibility of reusing features that have been built by the first layers, with a reuse of features that corresponds to an efficient implementation.

Learning is generally based on the iterative update of the parameters of each of the layers, typically through backpropagation. In practice, backpropagation based on gradient descent computes the gradient of the loss with respect to the output of the last layer, and then this gradient is backpropagated using the chain rule of calculus. With backpropagation, each layer receives the gradient of the loss with respect to its output, and uses this quantity to derive the gradient of the loss with respect to the parameters, the weights of that particular layer. These quantities are then used to update the corresponding weights.

A standard method of training a neural network using gradient descent will now be described with reference to FIG. 1C. A neural network comprises a set of n layers, each of which comprises a set of 'neurons'. Each neuron in a layer computes a function of an input array to that layer based on the application of the layer parameters or weights, and applies a non-linear activation function such as a ReLU function. The resulting activations from different neurons are fed forward as the input array to the next layer. This may be referred to as a forward pass. Various types of neural networks exist including fully-connected neural networks, convolutional neural networks (CNNs) and recurrent neural networks (RNN). These are known in the art and their individual features will not be described herein.

The goal of learning is to arrive at a set of network weights that minimise some training objective. At a final layer of the network, a prediction is output, which may depend on the task the network is designed to perform. For example, for an image processing task, where the input is an image containing an object, the network may be structured to output a predicted class of the object, given a set of possible classes. Typically, a network is trained by providing a set of training data for which the correct output is known, and defining a loss function 100 which measures the cost of using the network prediction for a given input instead of the 'correct prediction' corresponding to that input. The network weights may be initialized based on random values with certain statistics. However, during training, the network weights are updated so as to minimise the loss function 100, i.e. to make the network predictions as close as possible to the 'correct' predictions.

A common optimisation scheme used to minimise the loss function is gradient descent. According to gradient descent, a gradient of the loss function may be computed with respect to the weights of the network, and each weight may be updated in the opposite direction to its respective component of the gradient, therefore 'pushing' the weights in the direction of minimal loss. The gradient with respect to the activations may also be computed as an intermediate step before computing the gradient of the loss function 100 with respect to the weights. Since the activations are a function of the weights, and the loss function 100 is a function of the activations, applying the chain rule allows the gradient with respect to the weights $\nabla_W$ to be calculated based on the gradient with respect to the activations $\nabla_A$. The gradient calculation 406 is shown in FIG. 1C. The loss function 100 is provided, along with the weights and activations 404 of the final layer in order to compute the gradient of the loss with respect to the weights of that layer. The results of these gradients are passed back through the earlier layers through backpropagation, where the gradients of the earlier layers are computed as a function of the gradients 402 in later layers using the chain rule. Backpropagation is well-understood in the art and therefore will not be described in further detail herein.

The weight update 408 applied at each layer is computed based on the gradient of the loss function with respect to the weights.

Note that the term 'gradient', while technically referring to a vector of partial derivatives, is used more generally herein to refer to both the gradient with respect to a weight or activation vector and the corresponding partial derivative components, computed with respect to a single weight or activation of the network. In other words, 'gradient' herein can refer to either individual components of a vector of partial derivatives or to the vector itself. A 'tensor' of gradients refers to an array of individual gradients of arbitrary dimension.

Gradient descent methods are highly effective and widely used to train neural networks. However, a common problem when training very large deep learning models comprising up to millions or even billions of weights is that the memory required to store the weights, activations (where activations are the output values of each node) and gradients at each layer is significant.

One way to reduce the required memory usage when training a deep learning model is to choose a representation for weights, activations and/or gradients of the network such that each value occupies fewer bits of memory.

In general, the term 'format' is used to refer to various aspects of a representation of a number in a computer. An IEEE 754 format is specified by a base (i.e. binary or decimal), a precision, and an exponent range. Floating-point formats as discussed elsewhere herein are assumed unless otherwise stated to be binary (base-two), but it should be noted that the techniques herein are not limited to binary formats, and the same methods may be applied to any format having any suitable base. The exponent range is defined by the number of bits allocated to represent the exponent in the given format. For example, the IEEE 754 standard specifies a binary16 as having one sign bit, e=5 exponent bits, and m=10 significand (or mantissa) bits. Note that although only 10 bits are explicitly assigned to the significand, an implicit lead bit is assumed to be 1 unless all the exponent bits are zero, in which case the lead bit is zero, thereby providing 11 bits of precision. According to the notation used elsewhere herein, this may be written '1.5.10'.

For binary16, the five exponent bits can represent any number from binary 00001 (1 in decimal) to binary 11110 (30 in decimal). This excludes the special values of 00000, which is used to indicate subnormal numbers, and 11111, which is used to represent infinity or NaN (not a number). However, as described above, an exponent bias is added to shift the range of the numbers representable by the exponent. The IEEE standard specifies an exponent bias of $b=2^{e-1}-1=15$ for the binary16 format, shifting the exponent range down from [1,30] to [−14, 15]. As mentioned above, the special value of 00000 for the exponent allows subnormal numbers (numbers below $2^{-14}$) by having the implicit lead bit as 0, such that the number is represented as:

$$(-1)^s \; 2^{1-b} \left(0 + \frac{d_1}{2} + \frac{d_2}{2^2} + \cdots + \frac{d_m}{2^m}\right),$$

such that the smallest subnormal representable by the 1.5.10 format is $2^{-10} \times 2^{-14} = 2^{-24}$. Therefore the exponent range, including subnormal numbers, is [−24,15] for an IEEE 754 binary16 number. Note the 'smallest' or 'lowest' representable value in a given format herein refers to the value with the smallest magnitude that is still representable in that format, irrespective of sign. It assumed unless otherwise stated herein that both positive and negative values of the magnitudes defined by a given exponent range can be represented, and signs will not be discussed further herein.

The IEEE binary16 format is widely used in many computer applications. It is commonly referred to as 'FP16' or 'half-precision', while the IEEE binary32, which defines a 32-bit floating-point format having 1 sign bit, e=8 exponent bits and m=23 mantissa bits, is referred to as 'FP32' or 'single-precision'. However, in specialised applications such as machine learning, in particular for large models, it may be advantageous to adjust the format used to represent data and parameters in a machine learning model.

Various aspects of the format are relevant for efficient and accurate representation of values in machine learning applications. Firstly, the number of bits of the format itself determines the range of values that can be represented and to what precision they can be represented, as well as the memory that each value will occupy. While 32-bit floating-point numbers can represent a very wide range of values, from $2^{-126}$ to $2^{127}$ (assuming the standard exponent bias $b=2^{e-1}-1=127$), in example applications having many millions of values to process and store, this can slow down processing, since more compute power is consumed in processing and storing a 32-bit value in computer hardware during, e.g. neural network training, than in processing and storing a 16-bit or an 8-bit value. In distributed systems, the cost of communicating data between compute nodes during neural network training or inference is also much lower for data stored in formats having smaller bit widths.

The trade-off when reducing the number of bits used to represent a given value is a loss in the accuracy of the representation. This occurs due to a reduction in the range of exponents, as well as a reduced number of mantissa bits. The reduced range means that a value falling above the highest representable number will 'overflow' as described above and a value below the lowest representable number will 'underflow', leading to lower accuracy overall as many values are lost. Values within the network, such as weights, activations and gradients, can span a wide range of values, and it may be difficult to represent all the values in a given low-precision format without losing large amounts of information, and degrading the performance of the network. In terms of precision, while a 32-bit floating-point number dedicates 23 bits to representing the mantissa, a 16-bit floating-point number only uses 10, and an 8-bit floating-point number, as described in further detail below, may only use 2 or 3. This means that, even when a given value falls within the range representable by a given float, significant rounding errors may be incurred when converting to a low-precision format as the value is rounded to a nearest significant figure.

For a format of a given number of bits, the range of values and the precision within that range are dependent on the number of bits assigned to each of the exponent and mantissa, as well as the exponent bias. When converting from a large bit width representation, such as FP32, to a small bit width representation, e.g. FP8, it is therefore desirable to find an assignment of bits and an exponent bias to represent the values of the network (e.g. weights, gradients, etc., as well as other network values such as optimiser state, described later) such that as many values as possible are represented as accurately as possible.

The aim of the method described below is to determine the best bias and assignment of bits for representing a set of values in a machine learning application.

FIG. 2 shows a flowchart of an example exponent bias and bit assignment selection method for representing a tensor of a neural network. 'Tensor' as used herein refers to an array of arbitrary dimension, and may include vectors, matrices.

Each array comprises elements, such as weights or activations, in a format of a pre-determined bit width, for example 8-bit floating-point format. In the example shown in FIG. 2, both the exponent bias and the bit assignment (e.g. 1.4.3 or 1.5.2) are selected. However, the same method can also be used to select a bias only, with the assignment of bits to the exponent and mantissa being predetermined. This is performed with the elements of the network tensor being represented in some initial numerical format, such as IEEE 754 32-bit floating-point format. In general, the initial format has more bits that the 'target' format into which the elements of the network tensor are being converted, since the goal is to accurately represent as wide a range as possible of the elements of the original network tensor more efficiently (i.e. using fewer bits). This conversion process may be referred to as 'quantization'. The methods described herein are generally described in the context of neural networks.

At step S202, a network tensor is received. The method of FIG. 2 can be performed either during training of the neural network, or during inference (i.e. the application of the trained neural network), or more generally for computations aimed at optimizing the neural network parameters or at producing an output relying on the neural network parameters (including, for example 'pre-training' or 'fine-tuning' of a neural network for specific downstream tasks). At inference, the network tensors could comprise network weights, i.e. the parameters of the neural network which are applied to the data, or activations, i.e. the output of the layers of the neural network, as described above. In training, where the training uses a gradient-based optimiser the network tensors could also comprise any of: gradients with respect to weights, gradients with respect to activations, or optimiser states, which are described in further detail below. More than one network tensor may be received at this step, with the data of the multiple tensors being processed together in the following steps.

At step S204, a histogram is generated from the elements of the network tensor or tensors received at step S202. The histogram collects the elements of the network tensor and allocates them to a plurality of bins based on their values. Both positive and negative values are representable in a given floating-point format due to the sign bit, so for the purpose of collecting tensor statistics, only the absolute value of each tensor element is considered for computing the bin counts. The bin edges are the exponent values within the exponent range defined by the initial numerical format in which the values of the network tensor are represented, i.e. for an initial FP16 representation, the first bin edge is $2^{-24}$, representing the lowest representable number in this format. The next bin edge would be $2^{-23}$, with all elements of the network tensor having an absolute value between $2^{-24}$ and $2^{-23}$ falling within the first bin. This binning continues across the full exponent range of the initial format to yield a histogram showing the distribution of values of the network tensor within the exponent range.

Statistically robust metrics described below may be used to provide a measure of similarity, or conversely, quantization loss, arising from the conversion of the network tensor values between the initial format and any given format having a particular exponent range size and exponent bias, with these metrics having numerical values (also referred to herein as scores) which can be compared for different possible exponent ranges to allow a best format to be selected for the network tensor based on an objective statistical measure. Note that once a best format is determined based on one or more statistical measures as described herein, the network tensor elements can be automatically converted to the selected format and processed and/or stored to memory in that format.

As is described in more detail below, with reference to FIGS. 3A and 3B, the assignment of bits to the exponent controls the size of a 'window' defining the representable exponent range of the given format, while changing the value of the exponent bias acts to slide this window. In the example method of FIG. 2, the goal is to find an optimal combination of bit assignment and exponent bias that leads to a representation of the network tensor in a numerical format that preserves as much of the initial tensor as possible as measured by an objective statistical metric.

At step S206, a format parameter value (i.e. an exponent bias value or a number of exponent bits) is chosen. In general, the present method is performed to determine the bias and exponent bits within a format of a predetermined number of bits, and the format parameter value includes a bias value and a number of exponent bits. For example, it may be determined that an eight-bit floating-point representation is desired, and the goal is to determine which bit assignment (1.4.3 or 1.5.2) and what value of the exponent bias is preferred for the 8-bit floating-point format into which the network tensor is being converted. In the present example, at step S206, both an exponent bias value and a number of exponent bits is selected, for example 1.4.3 and a bias of 0. However, the same method can be used to determine a best bias value for a given format having a predefined assignment of bits to the exponent and mantissa. The selection of the first format parameter value may be based on the first parameter or combination of parameter values of a predefined list or grid. One example approach is to perform a scan over all possible values of exponent bias for different numbers of exponent bits. Other search methods could also be considered, for example by adjusting the exponent bias at a later step based on results of other exponent bias values at previous steps.

At step S208, a metric is computed based on the histogram of the network tensor values as represented in the initial format, and the chosen format parameter values, i.e. bias and number of exponent bits. A variety of possible metrics may be used to measure the 'error' or 'accuracy' of the quantization of the network tensor within the window defined by the chosen parameter values. One example metric is the mean-square error between the histogram of network tensor values in the initial format and the quantised values for the same network tensor after being converted to the format with the chosen format parameters. This metric is computed based on the histogram of values by computing an estimate of the squared difference between the value at each bin of the histogram of initial network tensor values (e.g. $2^{-24}$, $2^{-15}$, etc.) and the same values represented in the target format, with a mean error being computed over all bins of the histogram by multiplying each squared difference by the frequency of values at the given bin. The terms 'target format' and 'candidate format' are used to describe a possible format into which the network tensor is to be converted, which is generally a low-precision format. The chosen assignment of bits to the exponent and mantissa of the target format determines the exponent range representable, but if the number of exponent bits is smaller than the number of exponent bits of the initial format, the exponent range representable in the target format is smaller, and not all bins of the initial histogram may have a representable value in the range of the target format. Therefore, the estimate of the mean-square error needs to sum the separate estimates of the quantization error due to saturation, which considers values in bins that cannot be represented in the target format, and the quantization error due to rounding, where we estimate the error variance assuming uniform distribution within each bin.

Once the mean error is computed, this provides an overall measure of difference between the initial network tensor values and the quantized network tensor values for the given format parameters selected at step S206. At step S210, a check is performed to determine if all format parameter values to be tested have been selected and evaluated according to the metric. As mentioned above, the format parameters (e.g. exponent bias and exponent bit width) may be selected from a list or grid to be traversed and evaluated in order. Alternatively, some other criteria may be applied to determine whether the searching and evaluation of format parameters is complete. For example, a threshold error rate may be defined, such that when a mean-square error falls below the threshold error rate, the search is stopped and no more format parameters are selected, since a format parameter meeting a threshold performance has been determined.

If the search is not finished, a new format parameter value or values is selected at step S212. In the present example, a new value may be selected for either one or both of the bias or the bit assignment. For example, a new bias value of 1 may be selected while the assignment of bins remains as 1.4.3. The metric is computed again at step S208, this time comparing the histogram of network tensor values in the initial format with the candidate format defined by the newly selected format parameter(s). The same metric is computed for each selection of format parameter value. This process of selecting format parameter values and computing the metric S208 is repeated with different format parameter values to compute a metric for each of a set of target formats. As mentioned above, this may be performed by systematically searching through a grid of format parameter combinations, e.g. by first selecting 1.4.3 as the bit assignment, and computing the metric of interest for each target format having that bit assignment and each of a range of values of the exponent bias, and then selecting 1.5.2 as the bit assignment, and again computing the metric of interest for a target format corresponding to each of a range of values of the exponent bias and that bit assignment. Note that the range of exponent biases searched for each bit assignment may be different to reflect the different exponent ranges provided by different numbers of exponent bits.

Once the search is complete, i.e. all combinations in the grid of bias and bit assignment values have been evaluated, or some other stopping criterion is met, the values (scores) of the metrics computed for each of the target formats are compared (S214) and a best format is selected as the format corresponding to the combination of bias and bit assignment that lead to the optimal computed metric, where the optimal metric is the metric having the lowest value if the metric is a measure of error, and the metric having the highest value if the metric is some form of similarity or accuracy measure. Examples of metrics are described in more detail further below.

At step S216, the network tensor is stored to computer memory in the numerical format corresponding to the best format as determined in step S214. For the given network tensor, this format provides the most accurate representation of the tensor data for the predetermined number of bits assigned to the representation. If the method is used to determine a best 8-bit format for representing a tensor of weights, for example, and a target format with a combination of 1.5.2 bit assignment with a bias of 15 provides the lowest mean-square error between the set of weights in their initial format and the quantized weights in the target format, then the weights may be converted to that target format and stored to memory in that format. The weights can then be processed in arithmetic operations, and communicated between compute nodes efficiently since more weights can be processed and communicated for a given number of bits.

Note that the method described can be used to determine different optimal formats for different network tensors, and it may be advantageous in neural network training or inference to apply different quantization to different tensors within the network in dependence on their respective tensor statistics. In general, weights, activations, and gradients may have significantly different scales and ranges, and converting all of the weights, activations and gradients of a network to the same low-precision format leads to poor performance, since many values are lost when they fall outside the representable range for the chosen format. For low-precision formats, having e.g. 8 bits, it is no longer possible to apply a 'one size fits all' approach to representing the values of a network, unlike for 32 bit formats, where the exponent range can be broad enough to cover weights, activations and gradients spanning vastly different scales.

The method can be applied at any time during processing of a neural network to determine a best format for a tensor or tensors of the network, for example a tensor of activations may be aggregated to compute a histogram in order to perform statistical analysis to determine the best format, and the tensor can be converted to that format before processing the activations in, for example, a convolution at the next layer of the network. In some example implementations, tensors of the network are produced in a high-precision format, and are then converted to a lower-precision every time they are used for operations in which increased speed is critical. The same tensor therefore could be converted to different lower precision formats at different times during training.

The processing of network tensors to determine a best format and the conversion of the tensor into the determined format are automatically performed by a program executed by the processor or processors of the computer system on which the neural network is implemented. Histograms may be computed using a specific histogram instruction which takes a vector of tensor elements and a definition of histogram bin limits as an operand and adds to the bin count of each bin based on the values of the tensor elements. A specific instruction may also be executed by the processor or processors to convert the tensor elements from its initial format to the determined format.

Figure 3A:
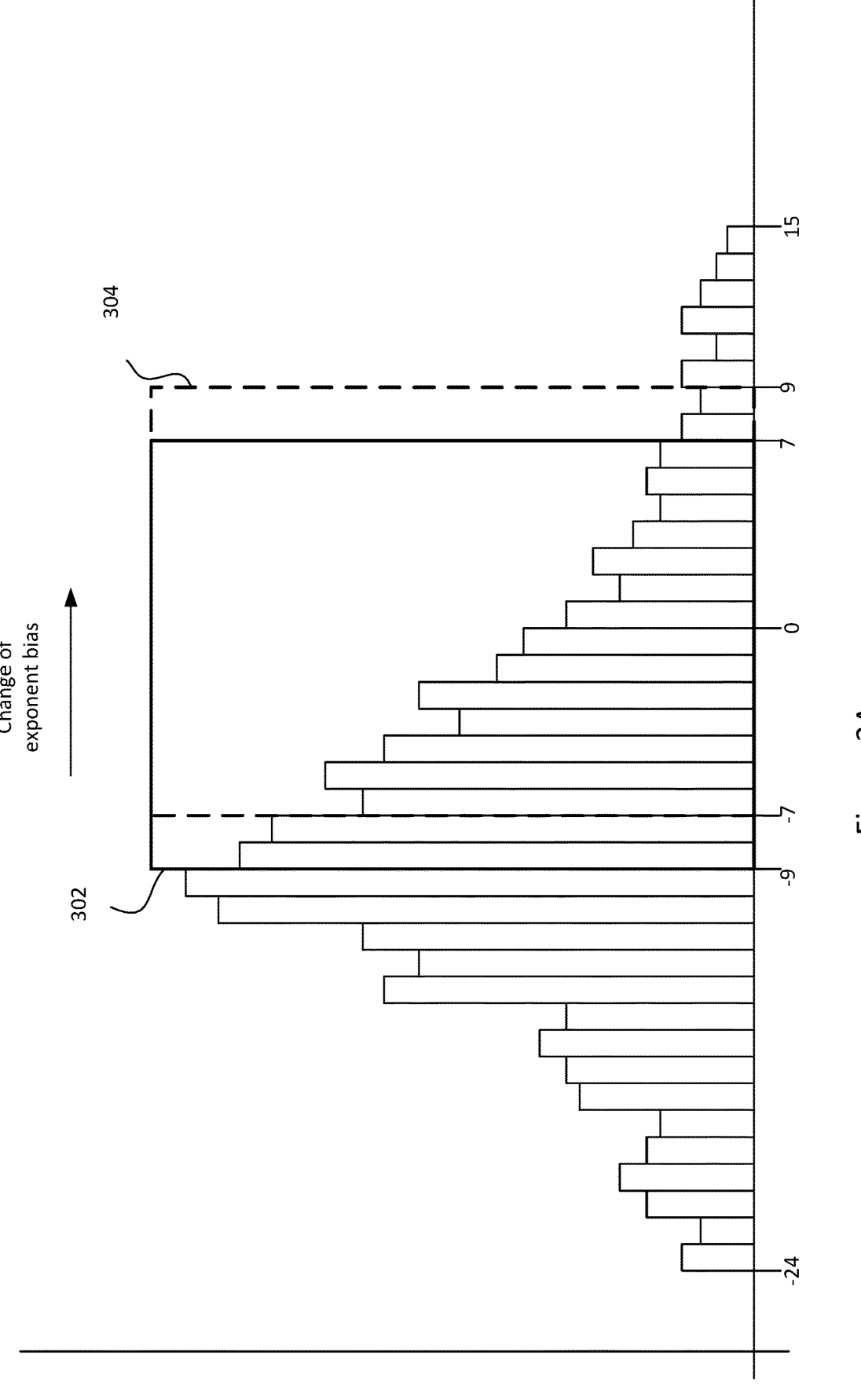
FIG. 3A shows the effect of adjusting an exponent bias on the range of values representable by a given format.

FIG. 3A illustrates how the exponent range of a given format can be represented as a window over a histogram of values represented in a higher-precision format. In the example shown, the histogram spans the exponent values from $2^{-24}$ to $2^{15}$. This corresponds to the exponent range for the FP16 format, i.e. a 1.5.10 format with an exponent bias of 15. If converting to an 8-bit floating-point format, the exponent range is reduced dramatically. Taking 1.4.3 as the bit assignment, the maximum number representable with four exponent bits, excluding the special value of 1111, is 1110=14. With an exponent bias of 7, the upper representable exponent is reduced by 7 to 7, and the lower representable exponent of 1 is reduced by 7 to −6, providing a format with four exponent bits that spans a range $[2^{-6}, 2^{7}]$, excluding subnormal numbers. As described above, the special value of 0000 for the exponent is used to indicate subnormal numbers, i.e. numbers taking the form $$(-1)^s \; 2^{1-b} \left( 0 + \frac{d_1}{2} + \frac{d_2}{2^2} + \cdots + \frac{d_m}{2^m} \right).$$

In the example 1.4.3 format, the m=3 mantissa bits provide an extra 3 exponent values, such that the total range spanned by a 1.4.3 format with a bias of 7 is $[2^{-9}, 2^7]$.

The default exponent range for the FP8 format 1.4.3 is indicated in FIG. 3A by the solid window 302. Changing the exponent bias shifts the uppermost and lowermost representable exponent values. Reducing the exponent bias shifts both the uppermost and lowermost representable exponent upwards, having the effect of 'sliding' the window rightwards towards higher exponent values without changing the size of the window itself. In the example shown in FIG. 3A, the bias is changed from 7 to 5, which results in the window shifting rightwards by two bins, as illustrated by the dashed window 304, with the minimum representable number being $2^{-7}$ and the maximum representable number being $2^9$.

Figure 3B:
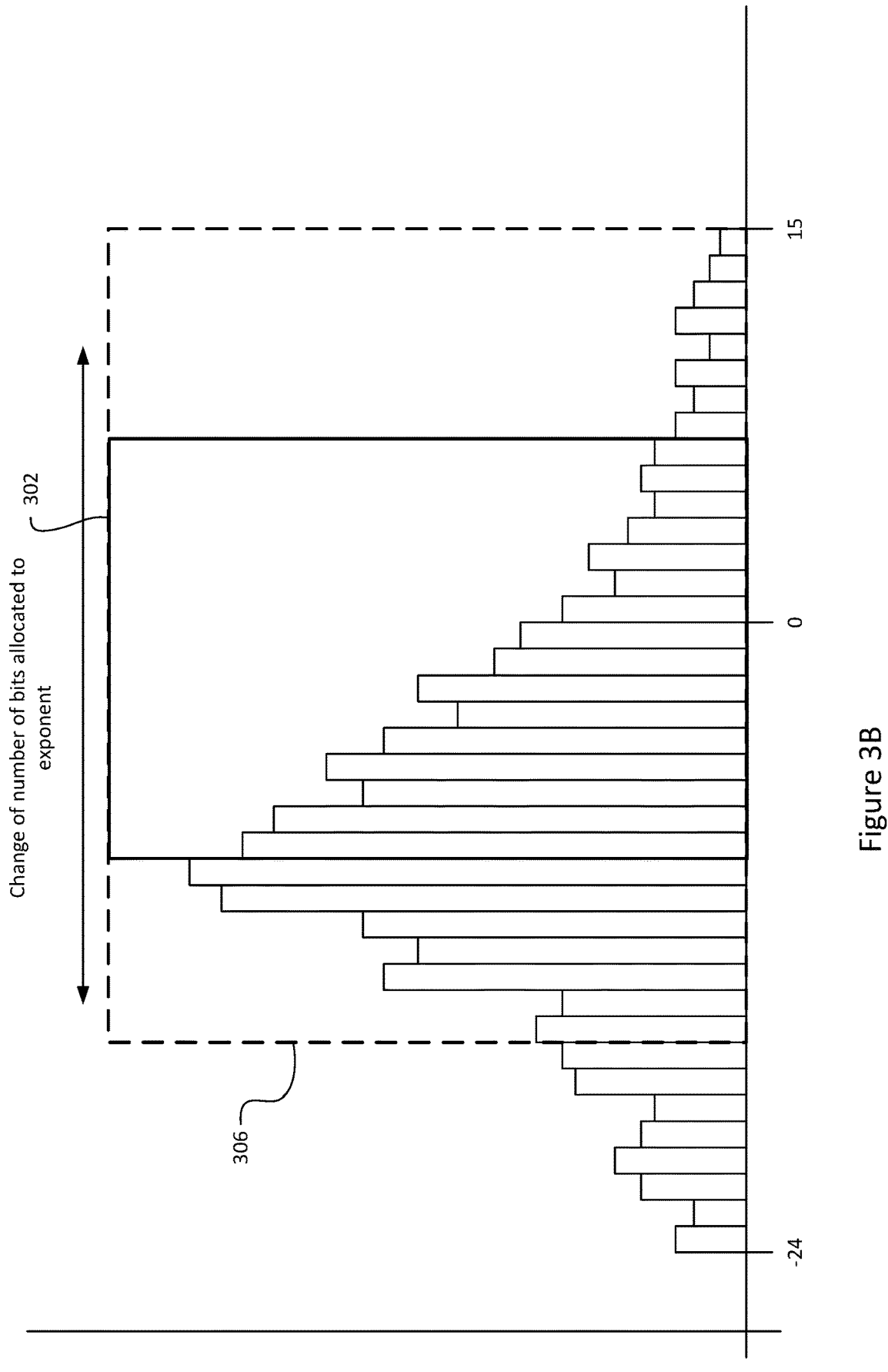
FIG. 3B shows the effect of adjusting a number of exponent bits on the range of values representable by a given format.

FIG. 3B illustrates the effect of changing the number of bits assigned to the exponent and the mantissa respectively. The present example shows the effect of changing the format from 1.4.3, i.e. one sign bit, e=4 exponent bits and m=3 mantissa bits, to 1.5.2, i.e. one sign bit, e=5 exponent bits, and m=2 mantissa bits. By increasing the number of bits representing the exponent, this increases the exponent range, such that the largest value representable has an exponent of 11110=30 (excluding the special value of 1111), assuming no bias. Taking a default bias of 15, the representable range is: $[2^{-14}, 2^{15}]$, excluding subnormal numbers. As above, subnormal numbers are indicated by a special exponent value of 00000, and are represented as $$(-1)^s \; 2^{1-b} \left( 0 + \frac{d_1}{2} + \frac{d_2}{2^2} + \cdots + \frac{d_m}{2^m} \right).$$

The two significand bits of the 1.5.2 format provide a further two significant figures at the lower end of the exponent range, expanding the range of exponent values to $[2^{-16}, 2^{15}]$. This range is illustrated by the dashed window 306 in FIG. 3B.

It is clear that by adjusting the number of bits assigned to each of the exponent and the significand, and by adjusting the exponent bias, different ranges of exponents can be covered by a target format having a predefined number of bits, which in the present example is eight. In general, as mentioned above, the goal in converting a set of values to a lower-precision format is to represent as many of the original values as accurately as possible, with accuracy being defined with respect to a metric, examples of which are described in more detail below. In the example shown in FIG. 3A and 3B, it is clear that the window corresponding to the 'best' format should include the region surrounding the peak of the histogram. Computing an accuracy/error metric for different values of the bias, i.e. different positions of the window covering this region, allows a best position of the window to be determined for representing that set of values.

When implemented for multiple individual network tensors, one can determine representations for different tensors that best represents the data in that tensor according to the distribution of values within that tensor, instead of choosing a single low-precision format, and representing all data in the network according to that format, which could lead to large amounts of data being inaccurately represented because it falls outside the range of representable values of the chosen format.

Metrics that may be used to determine error or representation accuracy between a histogram of values determined from an initial representation of a network tensor (or multiple network tensors) and a histogram of the same network tensor values converted to a candidate format will now be described.

As mentioned above, one possible metric for determining a measure of error between a histogram of values in an initial (higher-precision) format and the same set of values as represented in a candidate (lower-precision) format is the mean-square error. As described above, this takes a squared difference between each bin's value and the corresponding value after conversion to the candidate format, and computes a mean over all bins, with each bin weighted by its frequency in the histogram of values in the initial format.

Another possible metric that can be used to determine a measure of error between a set of values as represented in different floating-point formats is the Kullback-Leibler divergence (KL divergence). This is a statistical distance measure of the degree to which a first distribution is different from a second distribution. The KL divergence is defined for two discrete probability distributions P(x) and Q(x) as:

$$D_{KL}(P\|Q) = \sum_{x \in X} P(x) \; \log\!\left( \frac{P(x)}{Q(x)} \right).$$

It should be noted that the histogram of network tensor values in the initial format is not a probability distribution, but a histogram of counts of values falling into each bin. A corresponding histogram of network tensor values in the candidate format can be computed by determining the representation of each value of the network tensor in the candidate format, and then computing a count of values falling between each exponent value within the exponent range of the candidate format.

To adapt the KL divergence to measure the difference between a histogram of network tensor values represented in a first format and a histogram of network tensor values represented in a second format, both histograms must first be normalised to the form of a probability distribution i.e. such that $\Sigma_i h_i = 1$, where i is an index identifying the bin, and $h_i$ is the value of the histogram for bin i.

The KL divergence can then be computed by taking the initial normalised histogram (i.e. the normalised histogram of network tensor values represented in the initial format) as Q(x) and the candidate normalised histogram as P(x). Any bins outside the range for the histogram Q(x) of the candidate format contain zero elements and therefore correspond to a density of 0.

Since the KL divergence measures a degree of divergence or difference between the two distributions, the goal is to have a low KL divergence between the histogram of network tensor values in the initial format and the histogram of values when converted into the target format. Applying the method of FIG. 2, step S208 is repeated for multiple values of exponent bias and multiple bit assignments to compute a KL divergence for each combination of format parameter values. A 'best' format is determined in step S214 by selecting the exponent bias value and bit assignment associated with the lowest KL divergence, and the network tensor can be converted to this format for efficient storage and/or for efficiently performing arithmetic operations such as multiplications using those values.

Another possible metric that can be used to measure the difference between the values of a network tensor as represented in two different formats is referred to herein as format density. The objective of format density is to measure the 'probability' mass of the tensor values, with the goal of selecting the format with the highest 'probability' mass of the histogram falling within its exponent range. Note that, as mentioned above, the histogram itself is not a probability distribution, 'probability' mass simply refers to the total sum of the histogram bin counts falling within the defined range. For the sliding window shown in FIG. 3A, maximising the format density amounts to determining a size and position of the window that includes as much of the area of the histogram as possible.

When implementing the method of FIG. 2 step S208 is repeated for multiple bias values and multiple bit assignments to compute a format density, i.e. total bin count inside the exponent range for that bit assignment and bias. It should be noted that, while KL divergence described above requires the computation of a histogram of values of the network tensor converted into the candidate format in order to compute a divergence between the two distributions, the format density merely requires the exponent range of the target format to be computed, and the total 'mass' within that range is calculated as the measure of accuracy of the representation for that format. A 'best' format is determined in step S214 by selecting the bias value and bit assignment associated with the highest format density, i.e. highest total bin count within the target format's exponent range. The network tensor can then be converted to this format for efficient storage and/or for efficiently performing arithmetic operations such as multiplications using those values.

A fourth example metric that may be used to evaluate the accuracy/error of a given format for representing a set of values is signal-to-noise ratio. The signal-to-noise ratio is a ratio of a signal (in this case the digital representation of a number in a floating-point format) to a noise associated with that signal. The noise in the present case is the error associated with converting a real-valued signal to a floating-point representation having a predefined number of bits, which is also referred to herein as 'quantization noise'. This error occurs due to the inability to represent all real values in a discrete number of bits, such that some real numbers are rounded to the nearest representable number in that floating-point format, as well as underflow and overflow occurring when real numbers exceed the range of the floating-point representation. The number of mantissa bits determines how many significant figures can be represented in the given format, with more significand bits providing representations with lower noise, and greater accuracy for those real numbers falling within the exponent range of the format. There is a trade-off between high signal-to-noise ratio and exponent range, since more exponent bits provides greater range at the cost of greater noise due to rounding errors, while increasing the significand bits reduces noise but also reduces the exponent range since fewer exponent bits are available.

When implementing the method of FIG. 2 with SNR as the metric, step S208 is repeated for multiple bias values and multiple bit assignments to compute a signal to noise ratio for the set of network tensor values in the chosen format. A 'best' format is determined in step S214 by selecting the bias value and bit assignment associated with the highest signal to noise ratio. The network tensor can then be converted to this format for efficient storage and/or for efficiently performing arithmetic operations such as multiplications using those values.

Figure 4:
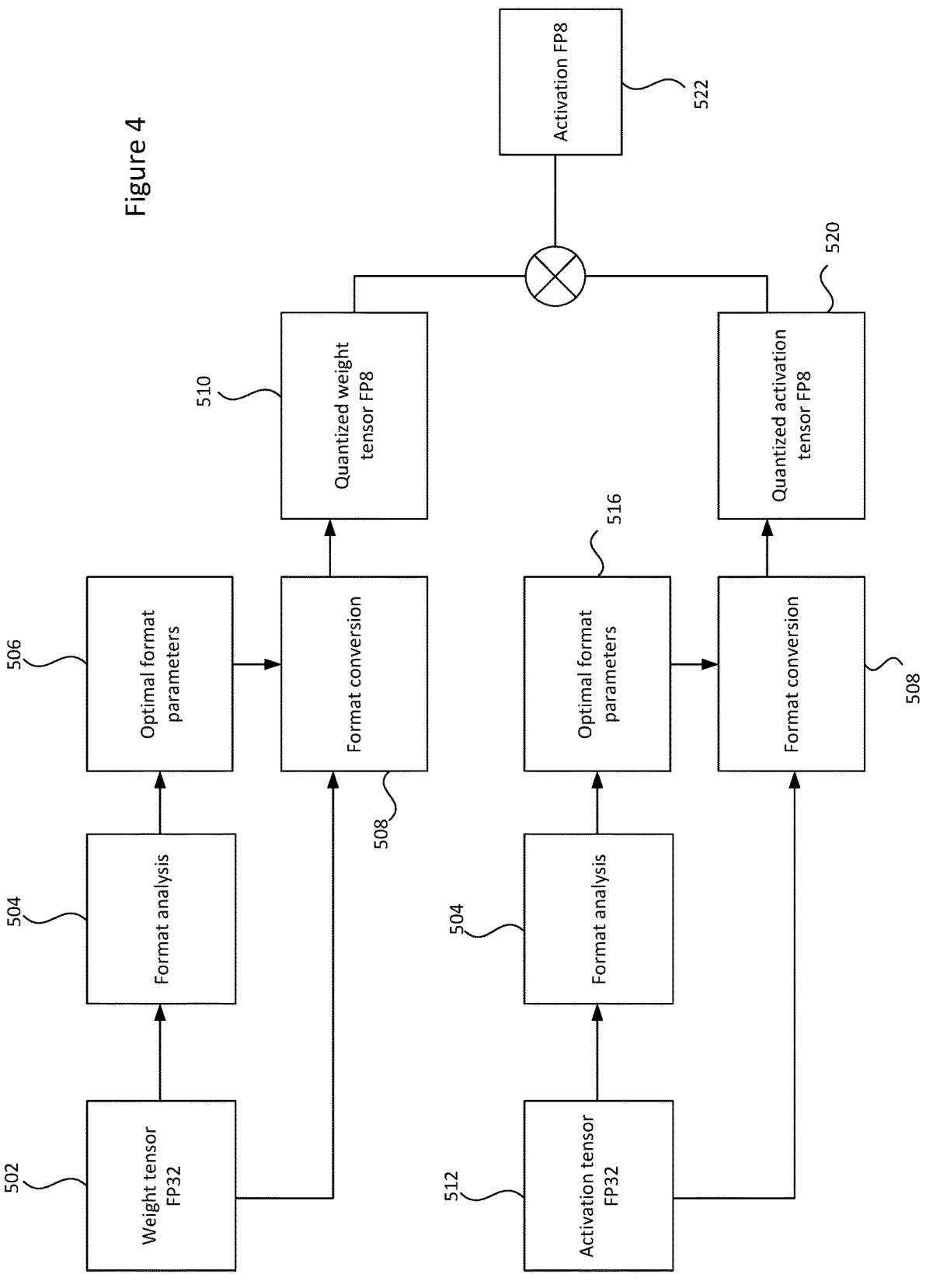
FIG. 4 shows an example conversion of tensors of a neural network to low-precision formats for arithmetic operations.

FIG. 4 shows an example of how the method described herein may be implemented to convert network data during neural network training or inference. The example shown in FIG. 4 shows a tensor of weights of a neural network and a tensor of activations of the neural network, as computed at a previous layer of the network, where, as described above with reference to FIG. 1A-1C, the activations computed at a given layer of the network are multiplied by the weights of the subsequent layer before computing the activations of that layer. In this example, each of the weight tensor 502 and the activation tensor 512 are converted from an initial 32-bit format to respective target 8 bit formats according to their respective tensor statistics as described in more detail below.

The weight tensor 502 is received with each weight being represented in a 32-bit floating-point format. A format analysis 504 is performed for the weight tensor, in which a histogram of the weights is computed, and a set of exponent bias values and bit assignments are evaluated according to a selected metric, according to steps S204-S214 of FIG. 2. The comparison of the evaluated metrics for each combination of bias and bit assignment values generates an optimal set of format parameters 506 (e.g. exponent bias value and bit assignment) according to the given metric (for KL divergence and mean-square error, the optimal pair is the pair that gives the lowest value of the metric, while for signal-to-noise ratio and format density, the optimal combination is the one that gives the highest value of the metric).

The weight tensor 502 in the initial 32-bit format is then converted in a format conversion 508 based on the optimal format parameters 506, into a lower-precision format (e.g. FP8) having an exponent bias and exponent bit assignment corresponding to the optimal format parameters, thus generating a quantized weight tensor 510 represented in an 8-bit floating-point format based on the statistics of that weight tensor.

Similarly, an activation tensor 512 is received with each activation of the tensor being represented in a 32-bit floating-point format. A format analysis 504 is performed for the activation tensor, in which a histogram of the activations is computed, and a set of exponent bias values and bit assignments are evaluated according to a selected metric, according to steps S204-S214 of FIG. 2. The metric chosen may be the same or different to the one used to evaluate the format parameters for the weight tensor 502. The comparison of the evaluated metrics for each combination of bias and bit assignment values generates an optimal set of format parameters 516 (e.g. exponent bias value and bit assignment) according to the given metric. The activation tensor 512 in the initial 32-bit format is then converted in a format conversion 508 based on the optimal format parameters 516, into a lower-precision format (e.g. FP8) having an exponent bias and exponent bit assignment corresponding to the optimal format parameters, thus generating a quantized activation tensor 520 represented in an 8-bit floating-point format based on the statistics of that activation tensor.

Finally, the quantized activation tensor 520 and the quantized weight tensor 510 can be multiplied, before applying an activation function as described with reference to FIG. 1B, in order to generate an output for the given layer, i.e. an activation tensor 522 represented in 8-bit floating-point format. This leads to faster multiplication across the network, since each weight and activation is reduced in size, and more weights and activations can be processed simultaneously.

While the above example describes a multiplication of a weight tensor with an activation tensor, which is a common operation in neural network training and deployment, the above-described method can be used to determine suitable formats for storing and processing any tensor within the network including gradients, activations, weights and states of the gradient-based optimiser used in training. Many gradient-based optimisers are known in the art, including the commonly used Adam optimiser, to perform a gradient-based training of the weights of a neural network. The Adam optimiser and other gradient based optimisers compute tensors known as optimiser state tensors during training, which may be stored and used in arithmetic operations, and for which it is advantageous to determine a low-precision representation for efficient processing. Optimisers and optimiser states are well-known and will not be described in detail herein.

The computer system on which a machine learning model is trained or implemented as described herein may comprise a single processor or an arrangement of multiple processors configured to run in parallel, wherein data, such as gradients or accumulated gradients, or in general quantities to be used for weight updates, etc., is exchanged between processors of the multi-processor system. Reducing the number of bits required to represent each element of a network tensor also speeds up the exchange of data between processors of a multi-processor system, since more individual elements of the tensor can be exchanged in given transfer of a fixed number of bits.

Storing, processing and communication of data of neural networks is performed by a computer processor or a system of multiple computer processors. The methods described herein for analysing the data of neural networks to determine suitable formats for their processing, storage and communications are implemented on the same computer processor or system of computer processors. The weights of the neural network and data input to the network are stored in memory, and these are read from memory as necessary during processing. At a first layer of the neural network, for example, an input vector or matrix is read from memory. For example, for a machine translation task, the input is a sentence or in a source language represented by a numerical vector using known word embedding techniques. A set of weights of the first layer is also read from memory, and the elements of the input vector are multiplied by respective weights in an execution unit of the processor or processor(s) by executing a set of instructions to implement arithmetic operations such as multiplications, and to apply activation functions and other functions. At any given step of processing, the processor(s) may compute a histogram of a given tensor, e.g. a set of weights of a layer of the network, determine a suitable format for the weights, and convert the weights to the determined format before implementing subsequent operations, such as matrix multiplication.

For large datasets, a neural network may be trained on a system of multiple computer processors, each storing a full neural network (i.e. a full set of weights defining the model) which is identical across the different processors. Each processor in this case processes a different respective subset of the input data (which could be training data or inputs during deployment of the model, say a set of texts to be translated or a set of images to be classified). This is referred to as 'data parallelism'. An example distributed computer architecture for data-parallel training of a neural network is described below with reference to FIG. 5. Alternatively, especially for large models having many weights, the model itself may be partitioned, with different parts of the model being processed on different processors of the computer system. Where each processor is provided with its own local memory, each subset of the model may be stored in the memory local to the processor which processes that part of the model.

Figure 5:
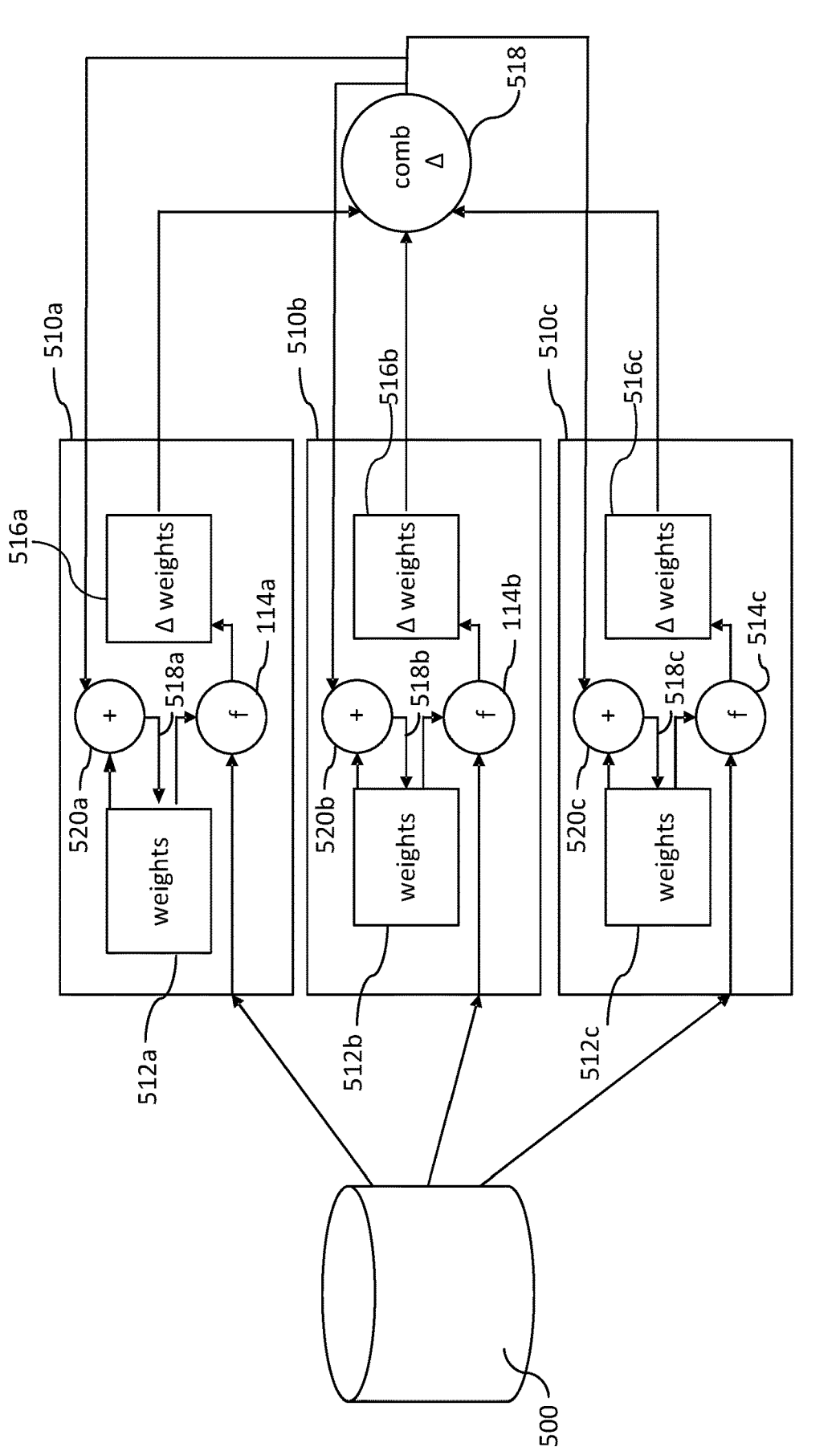
FIG. 5 is a schematic block diagram of a distributed architecture for training a neural network.

FIG. 5 is a schematic block diagram of an example distributed architecture comprising multiple processing units for training a neural network. A source of training data 500 is provided. This may be a database or any other kind of data store capable of holding training data applicable to the neural network model being trained. Processing according to the neural network model is itself distributed across multiple processing units 510a, 510b, 510c etc. Only three units are shown in FIG. 5, but it will readily be appreciated that any number of processing units could be utilised. Each processing unit 510a, b, c receives batches of training data from the training data source 500. Each processing unit 510a, b, c holds a set of weights 512a, 512b, 512c which define the model. An incoming batch of training data is processed with a current set of parameters in a calculation function 514 and the results of the calculation function are used to generate weight updates which represent the difference between the original weight and the new weight as a result of applying the calculating function on the batch of training data and the current set of parameters. The weights are labelled 512a, b, c and the weight updates are labelled 516a, b, c in FIG. 1. It will be appreciated that in practice the weights and weight updates are stored in suitable stores accessible by the processing unit. If the weights and weight updates can be held in local memory, this renders the training process much more efficient.

The aim with the architecture of FIG. 5 is not to train three separate models but to train a single model in a distributed manner. Therefore, the purpose is to have the model weights converged to a single common set in each processing unit. It is evident that starting from any particular set of weights, and assuming that the batch of training data received at each processing unit is not identical, then there will be a variation in the weight updates which are produced by each calculation function in each processing unit. What is needed therefore is a way to distribute the weight updates across the processing units after each iteration of batched training data. This is shown diagrammatically in FIG. 5 where a combinational function 518 receives the weight updates from each processing unit and performs a mathematical function which reduces the weight updates, such as an averaging function. The output of the combinational function 518 is then fed back to combining circuitry 520a, 520b and 520c within each processing unit respectively. A new set of weights is thus produced as a combination of the original weights and the combined output from the combinational function 518, and the new weights 518a, 518b, 518c are stored back into local memory. Then, the next batch of training data is supplied to each processing unit and the process repeats multiple times. It is evident that if the starting weights of the processing units are the same, then after each iteration they will be reset again to new values which are the same across all processing units. The weight updates are supplied to the combinatorial function 518 where they are reduced, and they are then supplied back to each of the processing units in their reduced form, where they can be combined with the original weights.

It is clear that representation of values such as the weight updates described above in a lower-precision format can lead to faster training, since more weights can be stored on local memory, which is more computationally efficient as mentioned above, functions of the weights and/or weight updates, such as the calculation function and the combinatorial function can be computed more quickly, and furthermore, more weight updates can be communicated in a given amount of time between processing units.

While particular embodiments have been described, other applications and variants of the disclosed techniques may become apparent to a person skilled in the art once given the disclosure herein. The scope of the present disclosure is not limited by the described embodiments but only by the accompanying claims.

A first aspect herein provides a computer-implemented method comprising: processing data in a neural network to compute a network tensor comprising a plurality of tensor elements represented in an initial numerical format; computing a histogram of tensor elements; selecting a target numerical format, the target numerical format having a lower precision than the initial numerical format; evaluating a metric based on the histogram of tensor elements and the target numerical format, the metric indicating a degree of accuracy of a representation of the network tensor in the target numerical format; and based on the evaluated metric, converting the plurality of tensor elements from the initial numerical format to the target numerical format.

In embodiments, the target numerical format is associated with a fixed range of representable exponent values.

In embodiments, the target numerical format is selected by selecting a value of an exponent bias of the target numerical format.

In embodiments, the target numerical format is selected by selecting a value of a number of exponent bits of the target numerical format.

In embodiments, the network tensor comprises at least one of: weights; activations; gradients of a loss function with respect to weights; and gradients of a loss function with respect to activations.

In embodiments, the method further comprises selecting multiple target numerical formats, and for each target numerical format, evaluating the metric based on the histogram and the target numerical format to generate a respective score for each target numerical format; and comparing the scores for each target numerical format to identify an optimal format parameter, converting the plurality of tensor elements from the initial numerical format to the target numerical format.

In embodiments, the format parameter comprises an exponent bias and a number of exponent bits, and the method comprises: selecting a first combination of an exponent bias and a number of exponent bits and evaluating the metric based on the histogram of tensor elements and the numerical format corresponding to the selected exponent bias and number of exponent bits, thereby generating a first score for the first combination; selecting a second combination of an exponent bias and a number of exponent bits, wherein at least one of the exponent bias and the number of exponent bits differs between the first combination and the second combination, and evaluating the metric based on the histogram of tensor elements and the numerical format corresponding to the second combination of exponent bias and number of exponent bits, thereby generating a second score for that combination of exponent bias and number of exponent bits; comparing the first and second score to determine a best combination of the first and second combinations; and storing a representation of the network tensor in the numerical format corresponding to the best combination.

In embodiments, the metric is one of: format density; mean-square error; KL divergence; and signal-to-noise ratio.

In embodiments, the method comprising applying an operation to the plurality of network tensor elements in the target numerical format. The operation may comprise at least one of a matrix multiplication and a convolution operation.

In embodiments, the target numerical format is an eight-bit format.

In embodiments, the method further comprises: computing a second network tensor comprising a plurality of second tensor elements represented in a second initial numerical format; computing a second histogram of second tensor elements; selecting a second target numerical format, the second target numerical format having a lower precision than the second initial numerical format; evaluating a metric based on the second histogram and the second target numerical format, the metric indicating a degree of accuracy of a representation of the network tensor in the second target numerical format; and based on the evaluated metric, converting the plurality of tensor elements of the second network tensor from the second initial numerical format to the second target numerical format.

In embodiments, the target numerical format and the second target numerical format are associated with different respective ranges of representable exponent values.

A second aspect herein provides a computer system comprising memory and one or more processors configured to: process data in a neural network to compute a network tensor comprising a plurality of tensor elements represented in an initial numerical format; compute a histogram of tensor elements; select a target numerical format, the target numerical format having a lower precision than the initial numerical format; evaluate a metric based on the histogram of tensor elements and the target numerical format, the metric indicating a degree of accuracy of a representation of the network tensor in the target numerical format; and based on the evaluated metric, convert the plurality of tensor elements from the initial numerical format to the target numerical format.

In embodiments, the computer system comprises a plurality of processors, wherein each processor is configured to process a respective subset of the neural network.

In embodiments, the computer system comprises a plurality of processors, wherein each processor is configured to process a respective subset of the data.

A third aspect herein provides a non-transitory computer-readable storage medium storing computer program instructions which when executed on one or more processors perform the steps of: processing data in a neural network to compute a network tensor comprising a plurality of tensor elements represented in an initial numerical format; computing a histogram of tensor elements; selecting a target numerical format, the target numerical format having a lower precision than the initial numerical format; evaluating a metric based on the histogram of tensor elements and the target numerical format, the metric indicating a degree of accuracy of a representation of the network tensor in the target numerical format; and based on the evaluated metric, converting the plurality of tensor elements from the initial numerical format to the target numerical format.

The invention claimed is:

1. A computer-implemented method comprising:
processing data in a neural network to compute a network tensor comprising a plurality of tensor elements represented in an initial numerical format;

computing a histogram of tensor elements;

selecting a target numerical format, the target numerical format having a lower precision than the initial numerical format;

evaluating a metric based on the histogram of tensor elements and the target numerical format, the metric indicating a degree of accuracy of a representation of the network tensor in the target numerical format; and based on the evaluated metric, converting the plurality of tensor elements from the initial numerical format to the target numerical format.

2. The method of claim 1, wherein the target numerical format is associated with a fixed range of representable exponent values.

3. The method of claim 1, wherein the target numerical format is selected by selecting a value of an exponent bias of the target numerical format.

4. The method of claim 1, wherein the target numerical format is selected by selecting a value of a number of exponent bits of the target numerical format.

5. The method of claim 1, wherein the network tensor comprises at least one of:

weights;

activations;

gradients of a loss function with respect to weights; and gradients of a loss function with respect to activations.

6. The method of claim 1, comprising:

selecting multiple target numerical formats, and for each target numerical format, evaluating the metric based on the histogram and the target numerical format to generate a respective score for each target numerical format; and comparing the scores for each target numerical format to identify an optimal format parameter, converting the plurality of tensor elements from the initial numerical format to the target numerical format.

7. The method of claim 2, wherein the format parameter comprises an exponent bias and a number of exponent bits, the method comprising:

selecting a first combination of an exponent bias and a number of exponent bits and evaluating the metric based on the histogram of tensor elements and the numerical format corresponding to the selected exponent bias and number of exponent bits, thereby generating a first score for the first combination;

selecting a second combination of an exponent bias and a number of exponent bits, wherein at least one of the exponent bias and the number of exponent bits differs between the first combination and the second combination, and evaluating the metric based on the histogram of tensor elements and the numerical format corresponding to the second combination of exponent bias and number of exponent bits, thereby generating a second score for that combination of exponent bias and number of exponent bits;

comparing the first and second score to determine a best combination of the first and second combinations; and storing a representation of the network tensor in the numerical format corresponding to the best combination.

8. The method of claim 1, wherein the metric is one of:

format density;

mean-square error;

KL divergence; and signal-to-noise ratio.

9. The method of claim 1, comprising applying an operation to the plurality of network tensor elements in the target numerical format.

10. The method of claim 9, wherein the operation comprises at least one of a matrix multiplication and a convolution operation.

11. The method of claim 1, wherein the target numerical format is an eight-bit format.

12. The method of claim 11, further comprising:

computing a second network tensor comprising a plurality of second tensor elements represented in a second initial numerical format;

computing a second histogram of second tensor elements;

selecting a second target numerical format, the second target numerical format having a lower precision than the second initial numerical format;

evaluating a metric based on the second histogram and the second target numerical format, the metric indicating a degree of accuracy of a representation of the network tensor in the second target numerical format; and based on the evaluated metric, converting the plurality of tensor elements of the second network tensor from the second initial numerical format to the second target numerical format.

13. The method of claim 11, wherein the target numerical format and the second target numerical format are associated with different respective ranges of representable exponent values.

14. A computer system comprising memory and one or more processors configured to:

process data in a neural network to compute a network tensor comprising a plurality of tensor elements represented in an initial numerical format;

compute a histogram of tensor elements;

select a target numerical format, the target numerical format having a lower precision than the initial numerical format;

evaluate a metric based on the histogram of tensor elements and the target numerical format, the metric indicating a degree of accuracy of a representation of the network tensor in the target numerical format; and based on the evaluated metric, convert the plurality of tensor elements from the initial numerical format to the target numerical format.

15. The computer system of claim 14, wherein the one or more processors comprises a plurality of processors, wherein each processor is configured to process a respective subset of the neural network.

16. The computer system of claim 14, wherein the one or more processors comprises a plurality of processors, wherein each processor is configured to process a respective subset of the data.

17. A non-transitory computer-readable storage medium storing computer program instructions which when executed on one or more processors perform the steps of:

processing data in a neural network to compute a network tensor comprising a plurality of tensor elements represented in an initial numerical format;

computing a histogram of tensor elements;

selecting a target numerical format, the target numerical format having a lower precision than the initial numerical format;

evaluating a metric based on the histogram of tensor elements and the target numerical format, the metric indicating a degree of accuracy of a representation of the network tensor in the target numerical format; and based on the evaluated metric, converting the plurality of
tensor elements from the initial numerical format to the
target numerical format.

* * * * *